(12) United States Patent
McCarley et al.

(10) Patent No.: US 11,676,149 B2
(45) Date of Patent: *Jun. 13, 2023

(54) METHODS AND SYSTEMS FOR ROUTING TRANSACTIONS BETWEEN AUTOMATED TELLER MACHINES, POINTS OF SALE, FINANCIAL INSTITUTIONS, AND SOFTWARE WALLETS

(71) Applicant: NCR Corporation, Atlanta, GA (US)

(72) Inventors: Jerry McCarley, Spring, TX (US); Mohammad Fraz Ahmed, Sugarland, TX (US); Michael Winbun, Houston, TX (US); Tammy Marks, Arlington, TX (US); Brad Nolan, Granville, OH (US); Paul Gardiner, Plano, TX (US); Michael Hafer, Highlands Ranch, CO (US); Chris Cochran, Highlands Ranch, CO (US)

(73) Assignee: NCR Corporation, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/675,262

(22) Filed: Feb. 18, 2022

(65) Prior Publication Data

US 2022/0180365 A1 Jun. 9, 2022

Related U.S. Application Data

(63) Continuation-in-part of application No. 16/844,477, filed on Apr. 9, 2020.

(Continued)

(51) Int. Cl.
*G06Q 20/40* (2012.01)
*G06Q 20/20* (2012.01)
*G06Q 20/10* (2012.01)

(52) U.S. Cl.
CPC ..... *G06Q 20/4014* (2013.01); *G06Q 20/1085* (2013.01); *G06Q 20/20* (2013.01)

(58) Field of Classification Search
CPC ........... G06Q 20/4014; G06Q 20/1085; G06Q 20/20; G06Q 20/40; G06Q 20/10
See application file for complete search history.

(56) References Cited

U.S. PATENT DOCUMENTS 7,815,104 B2 * 10/2010 Carpenter ............... G07F 19/20
705/16
8,556,707 B2 10/2013 Potts
(Continued)

FOREIGN PATENT DOCUMENTS

CN 106855977 A 6/2017

*Primary Examiner* — Kenneth Bartley
(74) *Attorney, Agent, or Firm* — Notaro, Michalos & Zaccaria P.C.; John S. Economou

(57) ABSTRACT

A system and method for routing ATM transactions. A transaction request is received at an external application programming interface (API) associated with an account holder. The external API runs on a first processor. The transaction request is validated and authorized at the external API. Information about the transaction is forwarded from the external API to an internal API associated with an automated teller machine (ATM). The internal API runs on a second processor. A unique identifier is generated for the transaction request and provided to a user. The unique identifier is received from the user at the ATM without the user presenting any card and without connecting a mobile device of the user to the ATM. The unique identifier is provided from the ATM to the internal API to confirm a validity of the transaction. The transaction is implemented at the ATM by either dispensing cash or accepting a deposit.

20 Claims, 8 Drawing Sheets

Related U.S. Application Data

(60) Provisional application No. 62/832,642, filed on Apr. 11, 2019.

(56) References Cited

U.S. PATENT DOCUMENTS

| | | | |
|---|---|---|---|
| 8,660,943 B1 | 2/2014 | Chirehdast | |
| 10,013,684 B2 | 7/2018 | Keys | |
| 10,535,047 B1 | 1/2020 | Thomas | |
| 10,984,419 B2* | 4/2021 | Ruparelia | G06Q 20/3278 |
| 11,315,092 B1* | 4/2022 | Dennis | G06Q 20/425 |
| 2002/0188575 A1 | 12/2002 | Freeny | |
| 2007/0095897 A1* | 5/2007 | Carpenter | G06Q 20/108 |
| | | | 235/379 |
| 2007/0250920 A1 | 10/2007 | Lindsay | |
| 2011/0119185 A1* | 5/2011 | Drummond | G07F 19/211 |
| | | | 705/43 |
| 2011/0238573 A1 | 9/2011 | Varadarajan | |
| 2012/0197796 A1 | 3/2012 | Dent | |
| 2012/0196586 A1 | 8/2012 | Grigg | |
| 2012/0226610 A1 | 9/2012 | Gill | |
| 2013/0054468 A1 | 2/2013 | Fuentes | |
| 2013/0226799 A1* | 8/2013 | Raj | G06Q 20/401 |
| | | | 705/44 |
| 2013/0346309 A1 | 12/2013 | Giori | |
| 2015/0074774 A1 | 3/2015 | Nema | |
| 2015/0199671 A1 | 7/2015 | Bajaj | |
| 2016/0063481 A1* | 3/2016 | Gupta | G06Q 20/1085 |
| | | | 705/72 |
| 2016/0086261 A1 | 3/2016 | Shah | |
| 2017/0039536 A1 | 2/2017 | Pandey | |
| 2017/0124544 A1 | 5/2017 | Recriwal | |
| 2017/0132593 A1* | 5/2017 | Block | G06Q 20/3223 |
| 2017/0236101 A1* | 8/2017 | Irudayam | G06Q 20/1085 |
| | | | 382/140 |
| 2017/0243184 A1 | 8/2017 | Bondesen | |
| 2017/0286958 A1 | 10/2017 | Herman | |
| 2018/0068297 A1 | 3/2018 | Goodman | |
| 2018/0137483 A1 | 5/2018 | McCann | |
| 2018/0350007 A1 | 12/2018 | Chen | |
| 2020/0327515 A1* | 10/2020 | McCarley | G06Q 20/3278 |
| 2021/0042727 A1* | 2/2021 | Fernandez Freire | G06Q 20/4012 |
| 2021/0264411 A1* | 8/2021 | McCarley | G06Q 20/385 |
| 2022/0180365 A1* | 6/2022 | McCarley | G06Q 20/326 |

* cited by examiner

METHODS AND SYSTEMS FOR ROUTING TRANSACTIONS BETWEEN AUTOMATED TELLER MACHINES, POINTS OF SALE, FINANCIAL INSTITUTIONS, AND SOFTWARE WALLETS

CROSS-REFERENCE TO RELATED APPLICATIONS

The present application is a continuation-in-part application of U.S. patent application Ser. No. 16/844,477, filed on Apr. 9, 2020, which, in turn, claims priority to U.S. Provisional Patent Application No. 62/832,642, filed on Apr. 11, 2019, the disclosures of which are incorporated herein by reference.

BACKGROUND

Software wallets (e.g., Venmo®, Paypal®, Amazon Pay®, Apple Pay®) provide services similar to banks using technology such as applications that run on users' smartphones or other computing devices. Traditional financial institutions (e.g., banks) also provide applications that enable users to handle certain banking operations from their computing devices. Both types of applications make it easier for users to handle certain types of transactions, but do not typically handle cash transactions such as deposits or withdrawals into software wallets or accounts with traditional financial institutions.

SUMMARY

The present disclosure presents new and innovative systems and methods for routing transactions between ATMs, financial institutions, and software wallets. In one embodiment, a method is provided comprising receiving a unique identifier corresponding to a transaction requested by a user at an automated teller machine (ATM) and routing the unique identifier to an application programming interface (API) affiliated with the ATM to confirm a validity of the transaction. The method may further include implementing the transaction by one or more of (i) dispensing cash to the user and (ii) accepting a deposit from the user and updating a settlement account to reflect the transaction.

The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION

In the present disclosure, like reference numbers refer to like elements throughout the drawings, which illustrate various exemplary embodiments of the present disclosure.

In many cases, software wallets lack cash dispensing or depositing capabilities. Similarly, consumers banking with traditional financial institutions may prefer to interact with ATMs without having to carry their credit or debit cards. Such consumers may therefore require a way to interface between the applications of, e.g., their software wallets or traditional financial institutions and ATMs or points of sale (POSs) (e.g., a physical merchant terminal or a virtual storefront) in order to deposit or withdraw cash from their accounts. Additionally, it may be preferable for the platform enabling such activities to be financial institution-agnostic, so consumers using different software wallets or banking with different financial institutions are able to use the ATMs and/or POSs services. One method for providing these capabilities is to provide an application programming interface (API) that routes transactions from ATMs to corresponding financial institutions to verify and carry out the consumer's desired operations.

Figure 1:
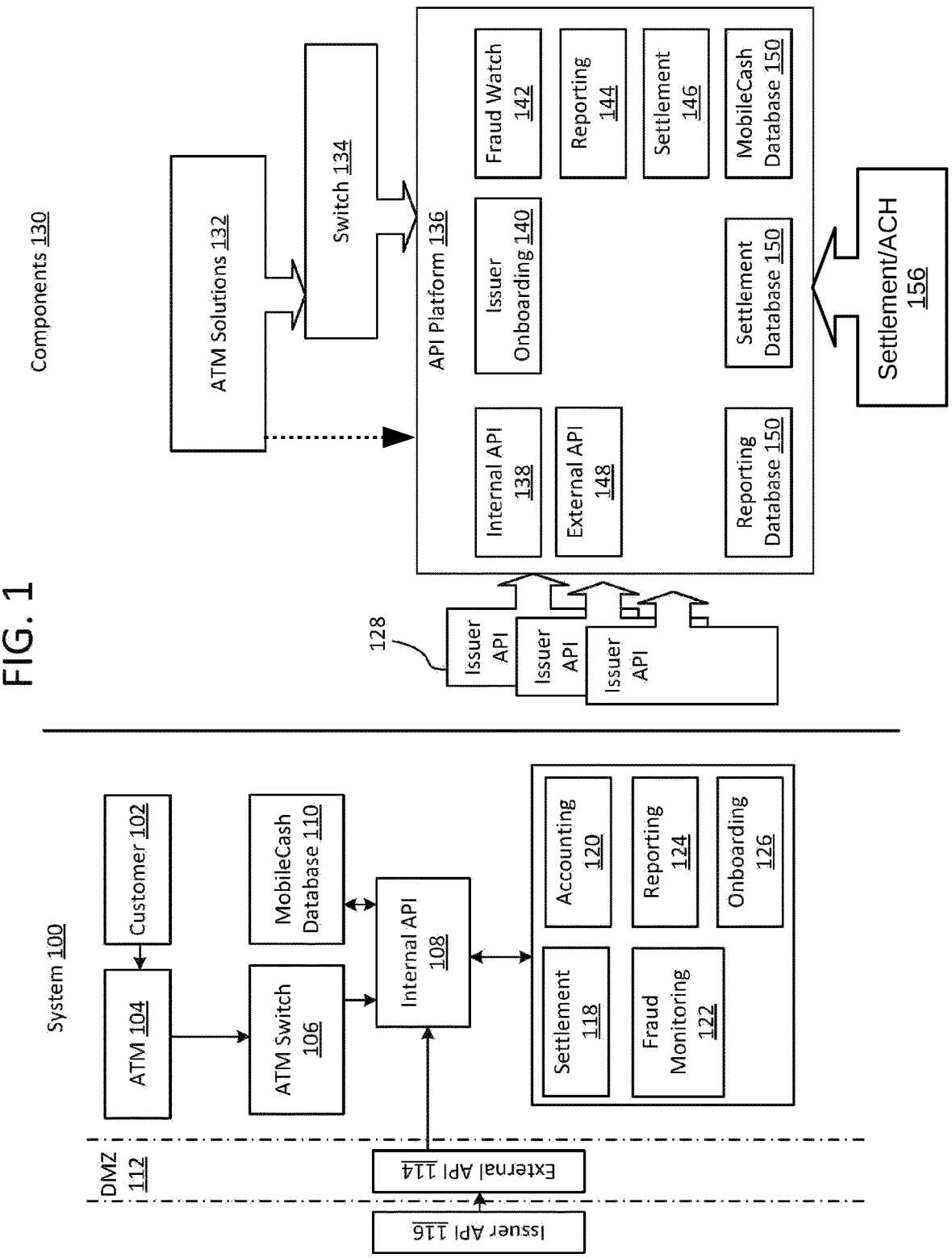
FIG. 1 illustrates a flow diagram and components according to an exemplary embodiment of the present disclosure.

FIG. 1 depicts a system 100 and associated components 130 according to an exemplary embodiment of the present disclosure. The system 100 includes a customer 102 and an ATM 104 that interact with one another. Although an ATM 104 is depicted in FIG. 1, the system 100 may also be configured to operate with POSs. Accordingly, it should be understood that references to an ATM in the present application expressly incorporate and apply to POSs as well, as well as any other computing device associated with a merchant. The ATM 104 may present one or more screens requesting information required to confirm, authorize, and carry out the customer 102's desired operations (e.g., depositing or withdrawing cash). The ATM 104 connects to an ATM switch 106, which may be responsible for carrying out networking and transaction routing operations on behalf of the ATM 104. The ATM switch 106 connects to an internal API 108. The internal API 108 may be provided by the same institution or company that provides the ATM 104 to properly analyze, route, and confirm transactions received from the customer 102 via the ATM 104. For example, the internal API 108 may interact with a mobile cash database 110 and internal systems such as settlement systems 118, accounting systems 120, fraud monitoring systems 122, reporting systems 124, and onboarding systems 126. The internal API 108 is also connected to an external API 114, which may be responsible for interfacing with an issuer API 116 to validate transaction information received at the ATM, as explained in greater detail below. Both the external API 114 and the internal API 108 may be implemented by the same institution responsible for the ATM 104, while the issuer API 116 may be implemented by another party, such as a software wallet provider or other financial institution.

The components 130 depict exemplary components that may be responsible for implementing the system 100. The components 130 include ATM solutions 132, such as the ATM 104 and a switch 134, such as the ATM switch 106. The ATM solutions 132 connects to a API platform 136 via the switch 134, or may optionally connect directly to the API platform 136 in certain implementations. The API platform 136 includes an internal API 138 and an external API 148, which may respectively implement the internal API 108 and the external API 114. The API platform 136 also includes an issuer onboarding module 140, which may include documentation and other information necessary for issuer institutions to interact with the API platform 136. For example, the issuer onboarding module 140 may include information on how to configure an issuer API 116, 128 to properly interface with, e.g., the external API 148. The API platform 136 also includes a fraud watch module 142, a reporting module 144, and a settlement module 146 respectively responsible for monitoring transactions through the API platform 136 for potentially fraudulent activity, logging and reporting transactions (e.g., per regulatory requirements or business requirements), and settling accounts for individuals and issuers (e.g., via the settlement and automated clearing house (ACH) system 156). The reporting module 144 may store reporting information in the reporting database 150. The settlement module 146 may store settlement information in the settlement database 152, and the internal API 138 may store transaction or other information in the mobile cash database 154.

In certain implementations, the system 100 may also be configured to incorporate with additional external APIs, such as the APIs of other cardless ATM or POS financial services (e.g., FIS®, Rapyd®). Further external APIs may facilitate compliance with "know your customer" and anti-money laundering requirements. Still further external API connections may enable additional features, such as money transfers, prepaid cards, and lending services. In certain implementations, the system 100 may also coordinate with additional external APIs to report transaction information to data aggregators, credit reporting agencies, customers, and other designated parties.

Figure 2:
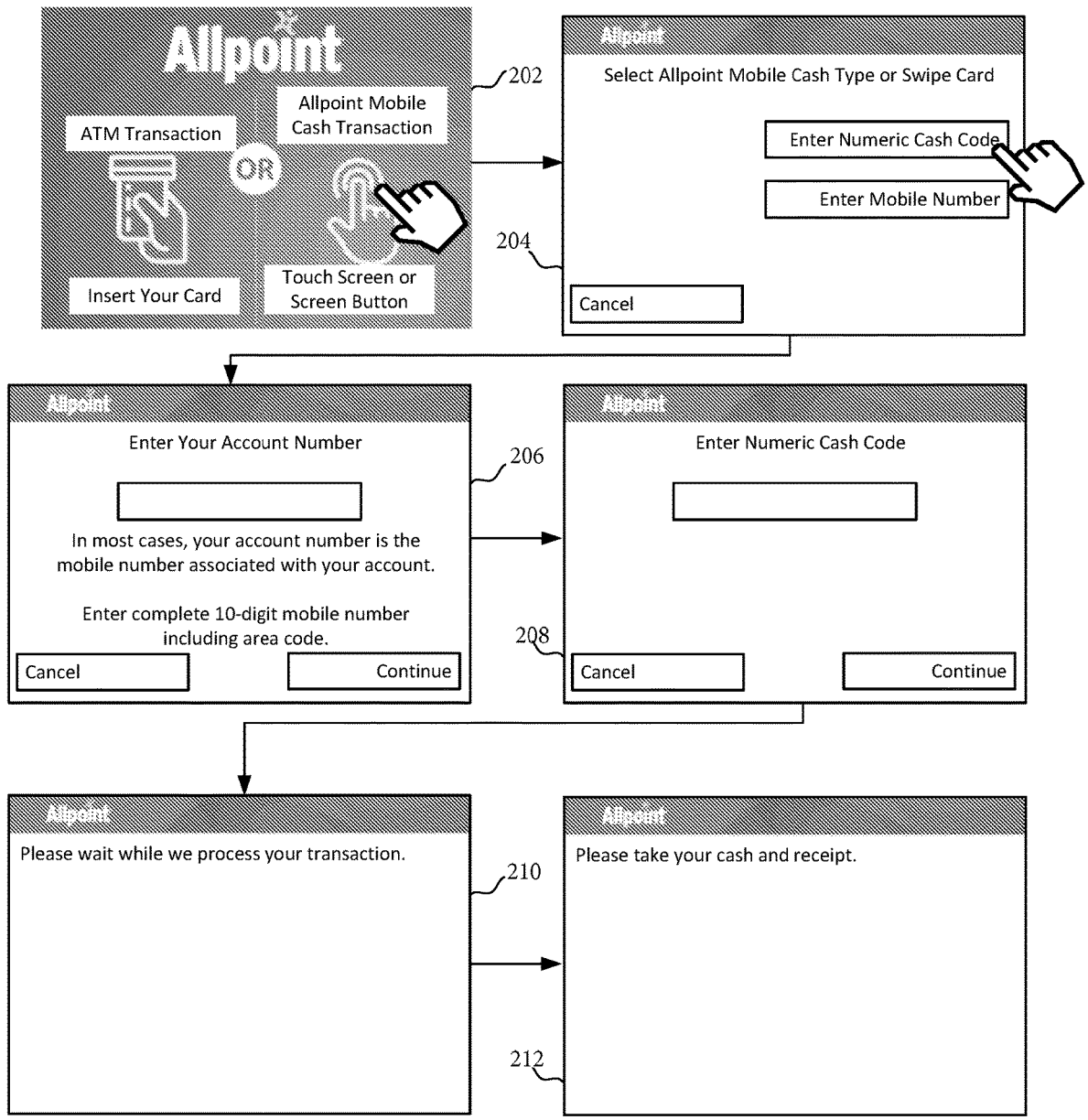
FIG. 2 illustrates a screen flow according to an exemplary embodiment of the present disclosure.

FIG. 2 depicts a screen flow according to an exemplary embodiment of the present disclosure. The screen flow may be presented by an ATM 104 to a customer 102 to enable the customer 102 to process a transaction using a unique identifier (e.g., a unique numeric identifier, a unique digital code, a unique transmission) provided by an application (e.g., a financial institution or software wallet application on a smartphone). In certain implementations, the unique identifier may be used to interact with a software wallet provider's API to enable the customer 102 to deposit or withdraw cash.

In the first screen 202, the customer 102 is presented with a selection between a traditional ATM transaction and a mobile cash transaction. If the customer selects a mobile cash transaction, the customer 102 is given the option to select between using a unique identifier to implement the transaction and using a QR code or a mobile number (discussed herein) on screen 204. If the user selects a unique identifier, the ATM 104 may present screen 206, requesting the customer 102 to enter an account number for the account from which they plan to withdraw or deposit cash. After the account number is entered, the ATM 104 may present screen 208 requesting a numeric cash code or unique identifier to validate the customer 102's requested transaction. The unique identifier may be presented within a mobile application of the customer 102's software wallet or financial institution. For example, the unique identifier may be received from the mobile application executing on the customer 102's mobile device after verifying one or more biometric scans of the customer (e.g., one or more scans of the customer's face, fingerprints, voice, and/or other biometric indicator). Additionally or alternatively, the unique identifier may be sent to a mobile number associated with the customer (e.g., a mobile number associated with the account number entered in screen 206) via text message or other messaging protocol. The unique identifier may be a single-use code (e.g., a code generated to only be valid for a single use and/or a predetermined period of time). Additionally or alternatively, the unique identifier may be used for multiple transactions (e.g., multiple transactions over a predetermined period of time). Furthermore, rather than entering the numeric cash code or unique identifier via the ATM 104, the customer 102's mobile device may be used to enter the numeric cash code or unique identifier. For example, the customer 102 may enter the numeric cash code or unique identifier via a mobile application associated with the customer 102's software wallet or financial institution. In further instances, rather than manually entering a code via the ATM 104 or the customer 102's mobile device, short-range wireless communication techniques may be used to transmit the unique identifier from the ATM 104 to the mobile device (or vice-versa). For example, near-field communication (NFC), Bluetooth, or other wireless communication protocols may be used to transmit the unique identifier from the ATM to the mobile device, which may then provide the unique identifier to a mobile application of the customer 102's software wallet or financial institution. After the unique identifier is entered, the ATM 104 and/or the mobile application may then validate the unique identifier (screen 210), allowing the ATM 104 to dispense or deposit the cash (screen 212). In certain implementations, an additional screen may appear between screens 210 and 212 to verify the amount of cash to be deposited or withdrawn.

Figure 3:
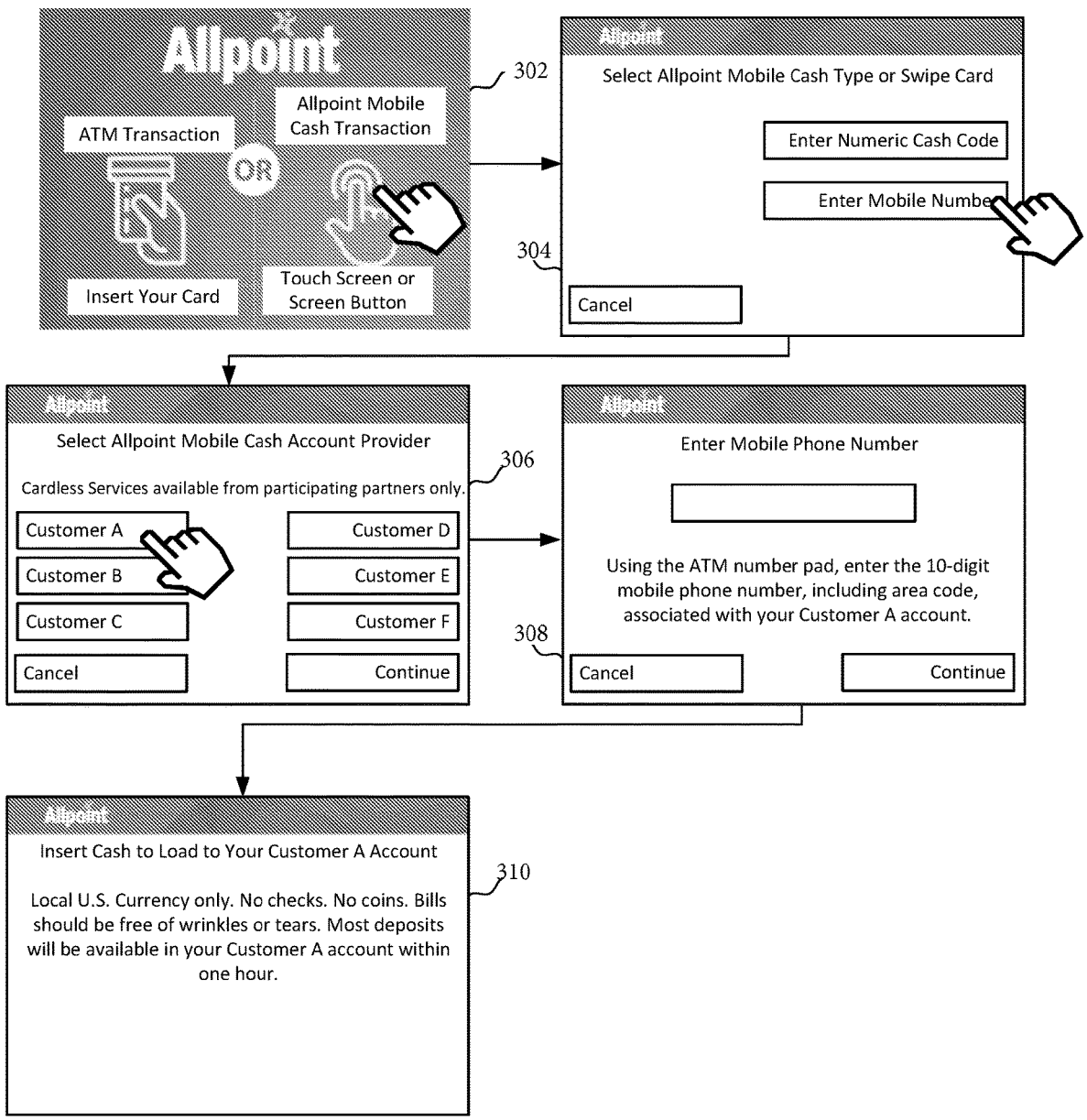
FIG. 3 illustrates a screen flow according to an exemplary embodiment of the present disclosure.

FIG. 3 depicts a screen flow according to an exemplary embodiment of the present disclosure. The screen flow may be presented by an ATM 104 to a customer 102 to enable the customer 102 to process a transaction using their mobile phone number. In certain implementations, the customer 102's phone number may be used to enable the customer 102 to deposit cash, but may restrict the customer 102 from withdrawing cash for security reasons.

In the first screen 302, the customer 102 is presented with a selection between a traditional ATM transaction and a mobile cash transaction. If the customer selects a mobile cash transaction, the customer 102 is given the option to select a mobile number or an account number to initiate the transaction on screen 304. The customer 102 may then be prompted in screen 306 to select an account provider (e.g., an issuer institution). After selecting the account provider, the customer 102 is prompted to input their mobile phone or account number associated with their account with the account provider in screen 308. In additional or alternative implementations, the customer 102 may be prompted to input different information, such as a unique identifier generated and received using techniques similar to those discussed above in connection with screen 208. The ATM 104 and/or a mobile application associated with the customer 102's software wallet or financial institution may then validate the transaction (screen 310) and enact the deposit according to the customer 102's request.

Figure 4:
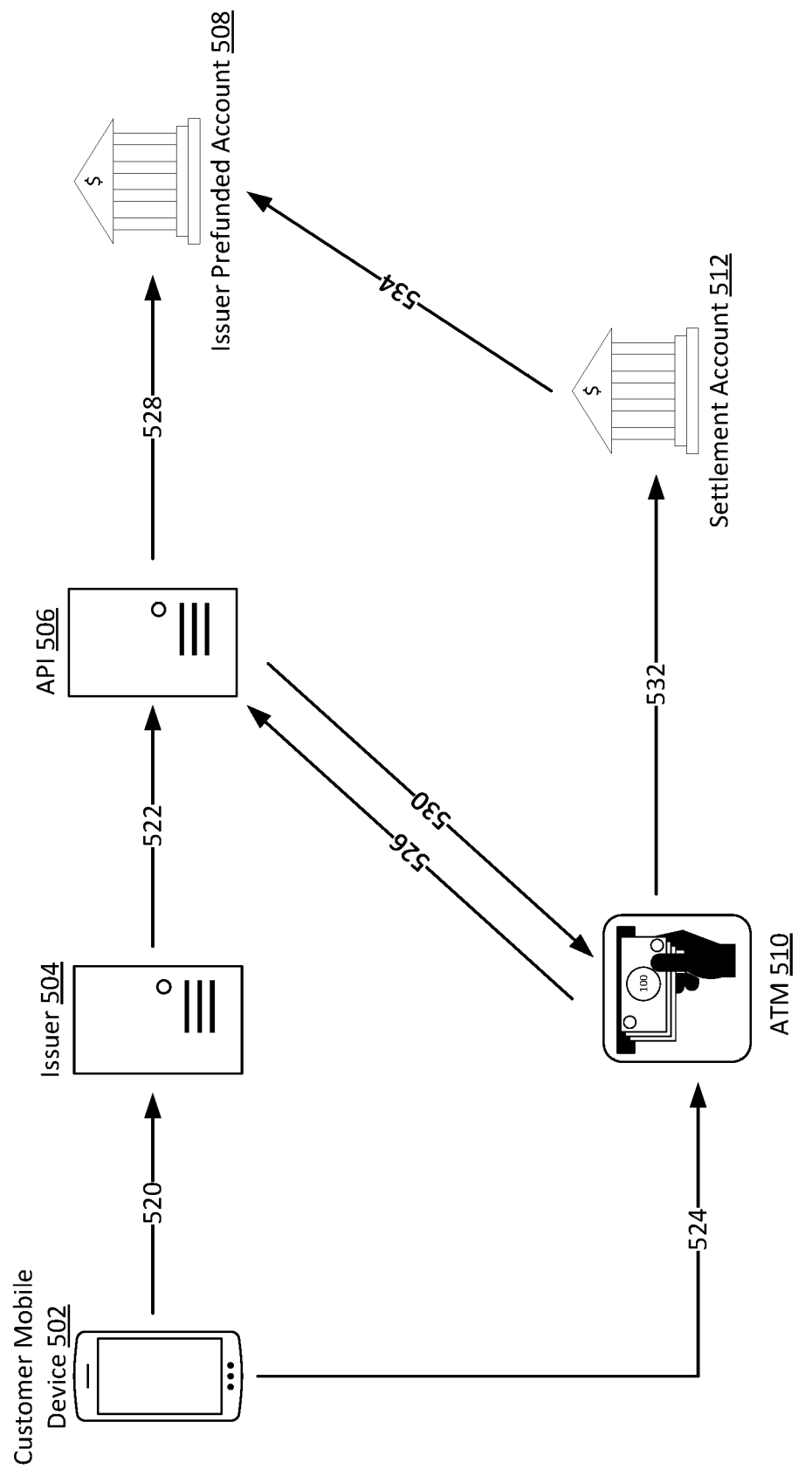
FIG. 4 illustrates a method according to an exemplary embodiment of the present disclosure.

FIG. 4 depicts a method for performing a staged transaction according to an exemplary embodiment of the present disclosure. In a staged transaction, the issuer may transfer money to a settlement account provided by the ATM provider when a customer requests a transaction via a corresponding application. In certain implementations, funds for staged transactions may be transferred from the issuer to the settlement at the end of the day. In such implementations, the funds may not transfer at the end of the day unless the customer 102 withdrew the funds from the ATM. Such staging may enable the customer 102 to withdraw cash from an account provided by a software wallet provider and/or a financial institution.

In other embodiments, the account provider (e.g., financial institution or software wallet provider) may stage a transaction on behalf of a customer. For example, if the customer works for an internet services company such as Uber®, Instacart®, DoorDash®, or Amazon®, the internet services company may transfer all or part of the wages earned by the customer 102 to a software wallet provided by the API provider associated with the customer 102. In certain implementations, some or all of the payment may be staged on behalf of the customer 102 for subsequent withdrawal from a POS or ATM. In addition, if the customer 102 works for multiple internet services companies, multiple companies may stage a transaction on behalf of the customer 102 and the customer 102 may then be able to withdraw the total amount staged by the multiple companies at the same time from a POS or ATM.

At step 520, the customer 102 requests to retrieve cash via the consumer mobile device 502 (e.g., a smartphone application). This request may be transmitted to the issuer or mobile cash provider 504 (e.g., the software wallet provider or the financial institution) via the consumer mobile device 502.

At step 522, the issuer may approve the withdrawal request after validating the customer 102's information and may send the customer 102's phone number, authorization code and withdrawal amount to the API 506 (e.g., an API provided by the ATM 510 provider). The authorization code may be created by the issuer 504 or by the API 506.

At step 528, the API 506 may verify the balance in a prefunded account 508 affiliated with the issuer 504. If sufficient funds are available in the prefunded account 508, the API 506 may then stage the transaction. In certain implementations, the API 506 may reduce the balance in the prefunded account 508 via a memo hold for each transaction staged. If sufficient funds are not available, the API 506 may not authorize or stage the requested transaction. At step 524, the customer 102 goes to the ATM 510 to perform the withdrawal. At the ATM 510, the customer 102 may enter their phone number, account number, and authorization code (e.g., unique identifier) into the ATM 510, similar to the screen flow depicted in FIG. 2. In certain implementations, the amount for the transaction may not need to be entered at the ATM 510 because the transaction has already been staged in the settlement account 512. Other methods of verifying the customer 102's identity are also possible (e.g., methods similar to those depicted in FIG. 3). In further implementations, the customer 102's identity may be verified by a third party regulatory services provider. For example, the regulatory services provider may provide an API that assists companies in complying with "know your customer," anti-money laundering, and customer identification regulatory requirements. In such instances, the API 506 may invoke the regulatory services provider's API to verify the customer 102's identity.

At step 526, the ATM 510 may connect to the API 506 to authorize the information provided by the customer 102. The API 506 may verify if the information provided is correct and if the corresponding transaction was staged. If the transaction was successfully staged, the API 506 may approve the transaction (step 530) and the ATM may dispense the cash (step 532). If the transaction was not staged, the transaction may be declined.

At step 534, after the ATM 510 has dispensed the cash, the settlement account 512 may reconcile with the prefunded account 508. For example, the settlement account 512 or the ATM 510 provider may send an ACH debit daily to the prefunded account 508 for all approved transactions redeemed at ATMs 510 provided by the ATM 510 provider. In other implementations, the settlement account 512 may reconcile with the issuer directly. For example, the API 506 may instead reconcile the transaction directly with the issuer (e.g., via a daily ACH).

Figure 5:
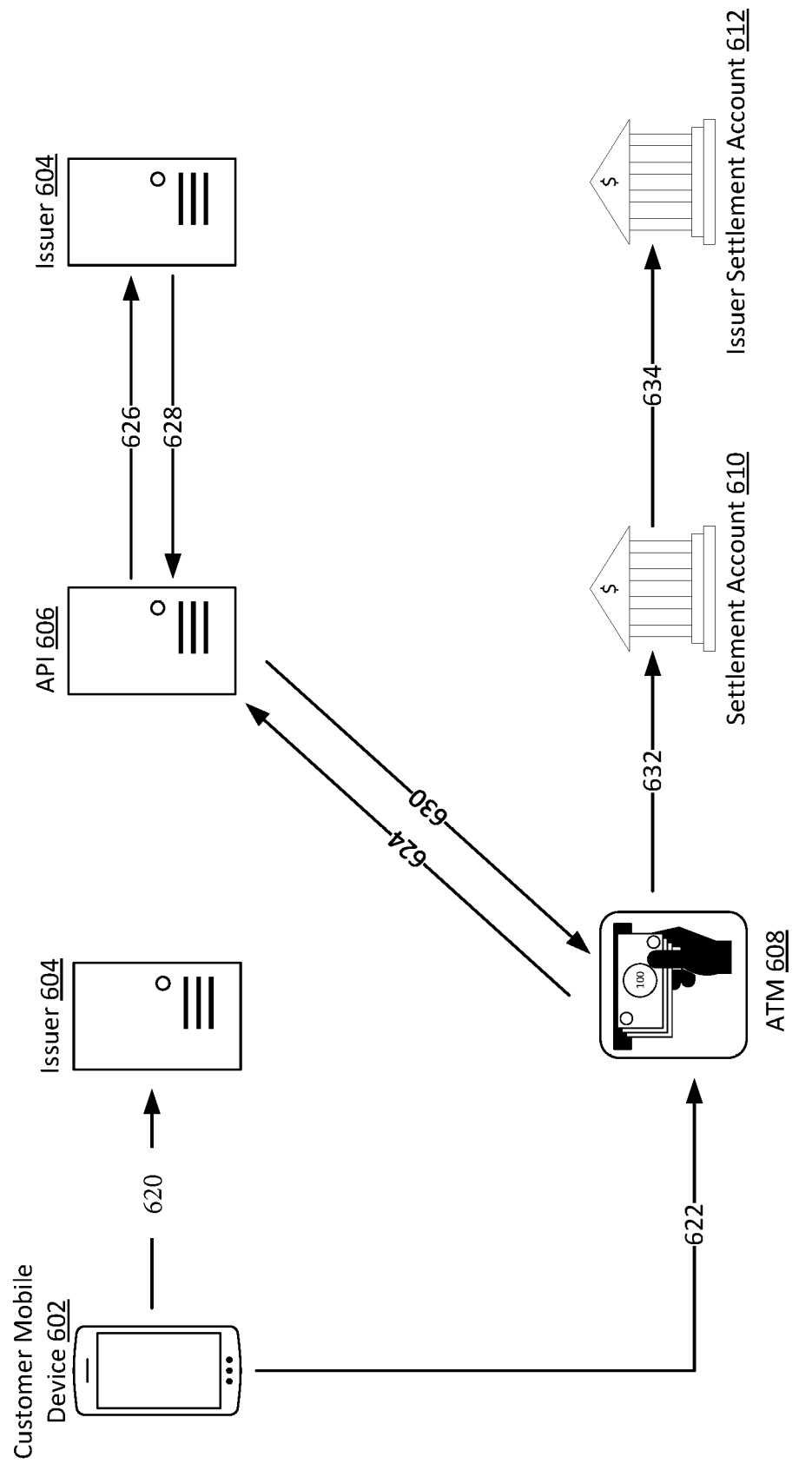
FIG. 5 illustrates a method according to an exemplary embodiment of the present disclosure.

FIG. 5 depicts a method for performing a direct transaction according to an exemplary embodiment of the present disclosure. In a direct transaction, the issuer may directly participate in the validation of a transaction request and may transfer the corresponding funds at least once each day (e.g., via a daily ACH) inclusive of the preceding transactions. Direct transactions may enable the customer 102 to deposit and withdraw cash from an account provided by merchant (e.g., a software wallet provider) and/or a financial institution.

At step 620, the customer 102 requests to withdraw or deposit cash via the consumer mobile device 602 (e.g., a smartphone application). This request may be transmitted to the issuer or mobile cash provider 604 (e.g., the software wallet provider or the financial institution) via the consumer mobile device 602. The issuer may then validate the customer 102's identity and may present an authorization code (e.g., a unique identifier). The authorization code may be generated using the API 606 or may be generated by the issuer 604 according to a different API (e.g., an issuer API 116) that meets the requirements of the API 606. The issuer 604 may then provide the authorization code to the user via the consumer mobile device 602 (e.g., via a smartphone application or via SMS or another messaging service).

At step 622, the customer 102 goes to the ATM 608 to perform the transaction. At the ATM 608, the customer 102 may enter an account reference (e.g., phone number or account number) and their authorization code (e.g., unique identifier) into the ATM 608, similar to the screen flow depicted in FIG. 3. Other methods of verifying the customer 102's identity are also possible (e.g., methods similar to those depicted in FIG. 3). Unlike the staged transaction of FIG. 4, the customer 102 may have to enter the transaction amount for a direct transaction, as the transaction is not staged.

At step 624, the ATM 608 connects to the API 606 to authorize the information provided by the customer 102. The API 606 may send an authorization request to the issuer 604 (e.g., an issuer API 116 of the issuer 604) to verify the information provided by the customer 102 (step 626).

At step 628, issuer 604 validates the information provided by the customer 102, including the authorization code. The issuer 604 may generate an authorization response indicating the validation result and may transmit the authorization response to the API 606. For example, if the information provided by the customer 102 is valid, the issuer 604 may approve the transaction (e.g., the deposit or withdrawal) and may include that approval in the authorization response. If the information is not valid, the issuer 604 may reject the transaction and may include that rejection in the authorization response.

At step 630, the issuer 604's authorization response may be sent to the ATM 608 from the API 606. If the authorization response includes an approval, the ATM 608 may dispense the cash for a withdrawal or process the deposit (step 632). If the authorization response includes a denial, the ATM 608 may deny the transaction.

At step 634, the settlement account 610 may reconcile with an issuer settlement account 612 affiliated with the issuer 604. For example, the settlement account 612 or the ATM 608 provider may send an ACH debit daily to the issuer settlement account 612 for all approved transactions redeemed at ATMs 608 provided by the ATM 608 provider.

Figure 6:
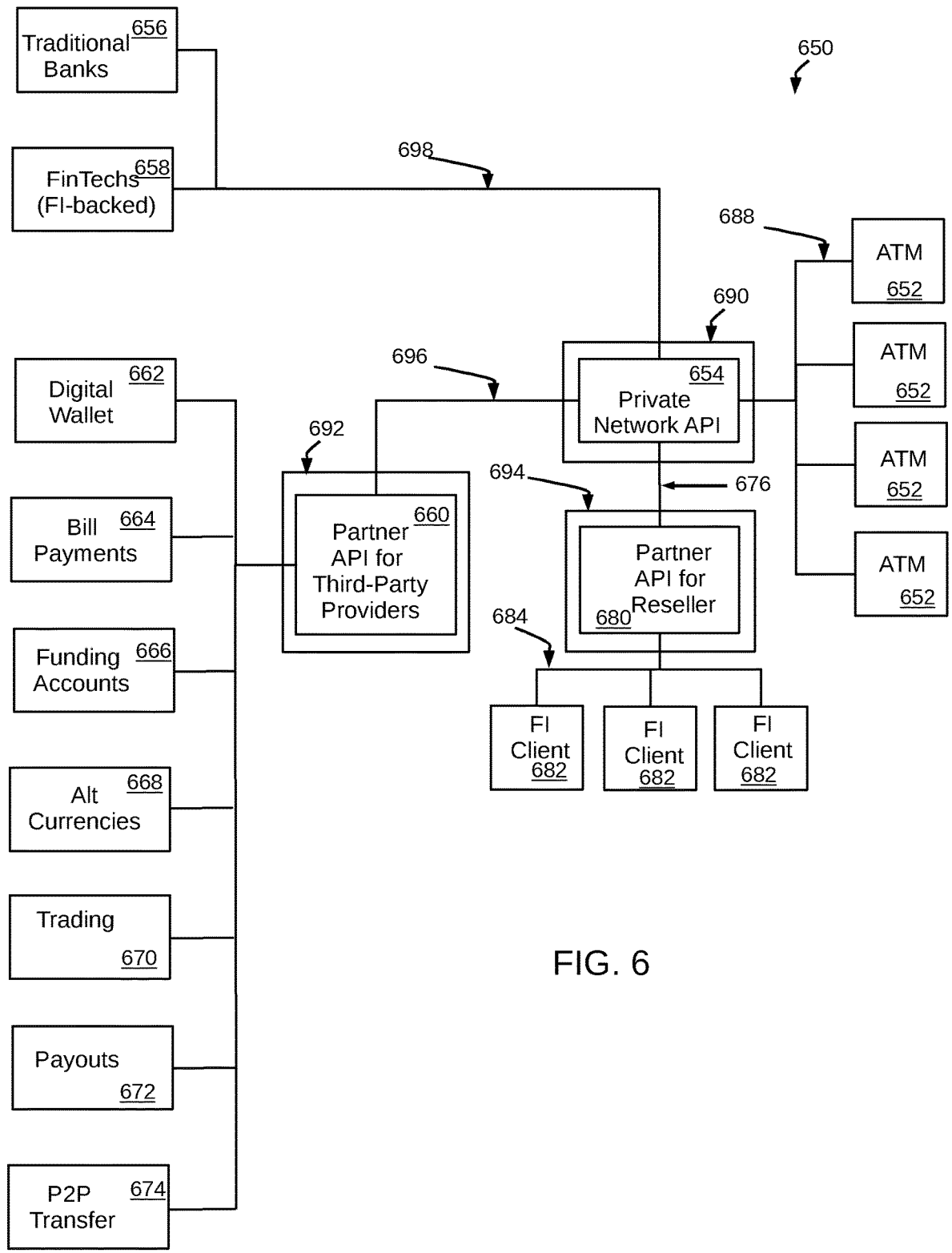
FIG. 6 illustrates a system diagram for one exemplary embodiment of the present disclosure.

Referring now to FIG. 6, a block diagram of a system 650 is shown which provides more detail of the operations available using system 100 of FIG. 1. In system 650, a series of ATMs 652 provided by a private ATM provider are all coupled to a private network API 654 which manages the operation of the ATMs 652. Each ATM 652 may correspond to ATM 104 in FIG. 1, and the private network API 654 may correspond to internal API 108 in FIG. 1. The private network API 654 may be provided on a server computer 690 located remotely from the ATMs 652. The ATMs 652 may be coupled to server computer 690 via a network 688. Network 688 may be a private network owned by the private AMT provider or may be a virtual private network (VPN) established between server computer 690 and the ATMs 652 over Internet connection therein.

The private network API 654 is coupled to traditional banks 656 and to fintechs (financial technology companies) 658 via a network 698. A fintech company has backing by a financial institution and is subject to the same regulatory requirements as a traditional bank. Network 688 may be a private network owned by the private AMT provider or may be a VPN operating over the Internet. Each connection with the private network API 654 via network 698 (i.e., traditional banks 656 and fintechs 658) may be via APIs located at the end connection and thus constitute a combination of an external API 114 and issuer API 116 shown in FIG. 1.

The private network API 654 is also coupled to a third-party provider partner API 660 via a network 696. The third-party provider partner API 660 may be provided on a remote-located server computer 692. The third-party provider partner API 660 manages communications and transactions with third-party providers that are not subject to the same regulatory requirements as a traditional bank. The third-party provider partner API 660 may, for example, ensure that all transactions with the various third parties meet regulatory compliance. Network 696 may be a private network owned by the private AMT provider or may be a VPN operating over the Internet. The third-party provider partner API 660 is coupled to various third party providers (collectively, merchants), including, for example, digital wallet companies 662, bill payment companies 664, funding accounts 666 (e.g., for prepaid cards or other accounts), alt currency companies 668, trading companies 670 (e.g., for payments from pawn shops, rebates/rewards, consignment store sales, and the like), payout companies 672 (e.g., for benefits, loans, prize-winnings, etc.), and peer to peer transfer companies (e.g., Western Union). The third-party provider partner API 660 corresponds to one example of the external API 114 shown in FIG. 1.

The private network API 654 is also coupled to a reseller partner API 680. The reseller partner API 680 may be provided on a remotely-located server computer 694. In turn, the reseller partner API 680 may be connected to one or more financial institution clients 682 via a network 684. Network 684 may be a private network owned by the reseller partner or may be a VPN operating over the Internet. The reseller partner has existing financial institution clients and the reseller partner API 680 allows the customers of the existing financial institution clients to gain access to ATMs 652 in the same manner as other users, as described above. The reseller partner API 680 corresponds to another example of the external API 114 shown in FIG. 1.

System 650 provides card-less deposits and withdrawals throughout the network of ATMs 652. System 650 allows nearly any type of business to perform a funds in or funds out transaction from an account held by the business (the account holder) to its customers without the need for either a dedicated identification card or an account linked to a customer bank card. System 650 also allows a user to conduct a transaction (e.g., deposit or withdrawal) without a customer bank card from their own account (in this case the user is the account holder).

Figure 7:
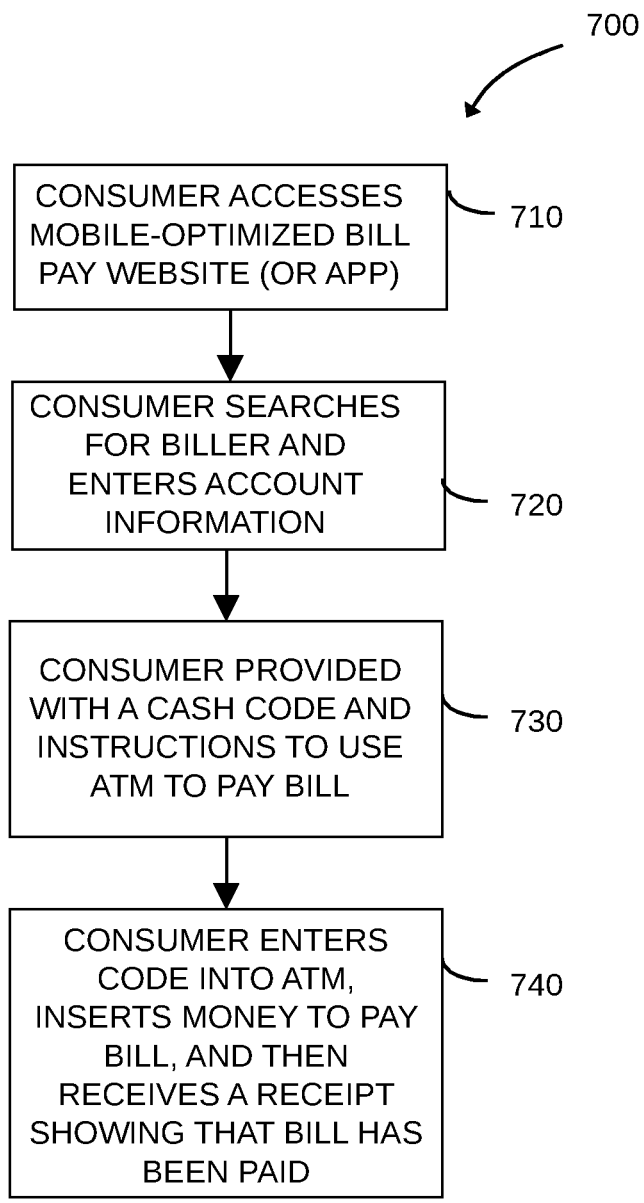
FIG. 7 illustrated a flowchart for another exemplary embodiment of the present disclosure.

Referring now to FIG. 7, a flowchart 700 is shown of a method according to an exemplary embodiment of the current disclosure for implementing a safe, secure, and convenient bill payment solution that is accessible across a fleet of ATMs (or other self-service terminals or kiosks) that allows a consumer to pay a billing party of any sort (the biller) at any ATM in the fleet. In this method, a consumer first accesses a mobile-optimized bill pay website (or a phone app) provided by the bill pay service at step 710. This can be done, for example, by scanning a QR code that is provided at or adjacent to the ATM, or on a billing statement from the biller. Next, at step 720, the consumer searches for the biller via the website (or phone app) and enters account information identifying that consumer's account. At step 730, the consumer is provided with a cash code or unique identifier via the website (or phone app) and also instructions to use the ATM (or other self-service terminal or kiosk) to pay a bill associated with the consumer's account. Finally, at step 740, the consumer enters the account information and cash code or unique identifier into the ATM (or other self-service terminal or kiosk) when prompted, inserts money to pay the bill, and then receives a receipt showing that bill has been paid. The method shown in flowchart 700 simplifies bill payment for consumers that have a need to use cash to pay their bills, while providing a safe and secure bill payment environment.

Figure 8:
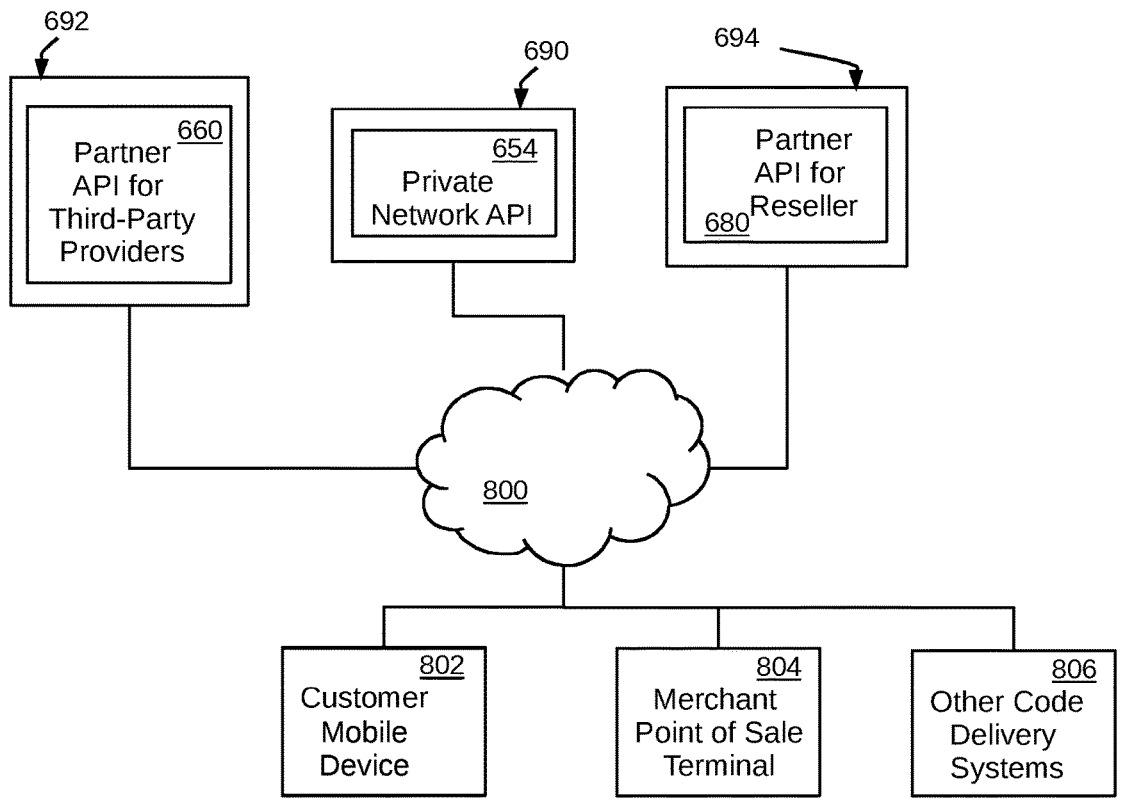
FIG. 8 illustrates a network diagram for an exemplary embodiment of the present disclosure.

Referring now to FIG. 8, a network diagram is provided showing how the private network API 654, the reseller partner API 680, and the third-party provider partner API 660 may be coupled via a wide area network 800 (e.g., the Internet) to a customer mobile device 802, a merchant point of sale terminal 804, or other type of authorization code delivery system 806 in order to obtain an authorization code (e.g., a unique identifier) to allow a customer to gain access to one of the ATMs 652 to perform a desired transaction. As explained above, a customer may use their mobile device 802 to communicate a request for, via an installed application or a website link, an authorization code from an issuer (e.g., any of the entities shown in FIG. 6, including a bank 656, fintech 658, digital wallet company 662, bill payment company 664, funding account 666, alt currency company 668, trading company 670, payout company 672, peer to peer transfer company 674, and client 682) in order to conduct a transaction with that issuer. In other cases, the authorization code may be requested via a merchant point of sale terminal 804 (e.g., for a transaction involving an account of the merchant and where the merchant is the issuer) and delivered via a printed point of sale receipt or a handwritten or oral message. In still other cases, the authorization code may be delivered in various other ways, including but not limited to an SMS (Short Message Service) message, an IVR (Interactive Voice Response system, a voice phone call, an email message, a mailed letter, a scratch-off lottery-like card (for, e.g., promotional prizes), etc. These latter cases can be useful in allowing cashless transactions where a user is provided with account information and an authorization code and then uses the ATM 652 to either receive cash money (e.g., a refund when a product was returned to a merchant or a prize award) or to provide payment (e.g., a deposit in advance of completing a purchase).

Figure 9:
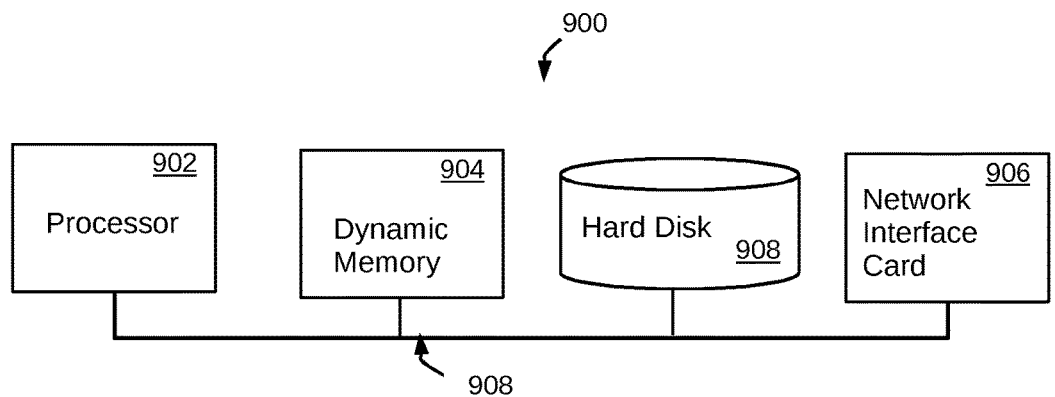
FIG. 9 illustrates a schematic diagram for an exemplary embodiment of the present disclosure.

Referring now to FIG. 9, a schematic drawing is provided for a server computer 900, that includes the basic components that may be used in each of the computer servers 690, 692, 694 shown in FIG. 6. Each server computer 900 may include at least one processor 902, dynamic memory (e.g., RAM) 904, static memory in the form of a hard disk 908, and a network interface card 906 for connecting to a local network (which, in turn may be connected to the Internet via an appropriate interface). In operation, program code for performing operations typically is stored on hard disk 908 and loaded into dynamic memory 904 at boot, and processor 902 is then able to execute the program code, as known in the art. Each API discussed herein may constitute program code stored and then processed in this manner.

All of the disclosed methods and procedures described in this disclosure can be implemented using one or more computer programs or components. These components may be provided as a series of computer instructions on any conventional computer readable medium or machine readable medium, including volatile and non-volatile memory, such as RAM, ROM, flash memory, magnetic or optical disks, optical memory, or other storage media. The instructions may be provided as software or firmware, and may be implemented in whole or in part in hardware components such as ASICs, FPGAs, DSPs, or any other similar devices. The instructions may be configured to be executed by one or more processors, which when executing the series of computer instructions, performs or facilitates the performance of all or part of the disclosed methods and procedures.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method comprising:
   receiving a transaction request at an issuer application programming interface (API) associated with an account holder, the issuer API running on a first processor;
   validating and authorizing the transaction request at the issuer API;
   forwarding information about the transaction from the issuer API to an internal API associated with an automated teller machine (ATM), the internal API running on a second processor;
   generating a unique identifier for the transaction request at the issuer API or at the internal API;
   providing the unique identifier to a user;
   receiving the unique identifier from the user at the ATM without the user presenting any card and without connecting a mobile device of the user to the ATM;
   providing the unique identifier from the ATM to the internal API to confirm a validity of the transaction; and
   implementing the transaction at the ATM by one or more of (i) dispensing cash to the user and (ii) accepting a deposit from the user.

2. The method of claim 1, wherein the transaction request is received via a point of sale terminal for a merchant.

3. The method of claim 2, wherein the unique identifier is provided to the user via the merchant point of sale terminal.

4. The method of claim 1, wherein the account holder is a merchant and wherein the transaction request is a request for a payment to the user from an account of the merchant.

5. The method of claim 4, further comprising debiting the account of the merchant by an amount of the requested payment to the user.

6. The method of claim 1, wherein the validity of the transaction is confirmed based on one or more of a phone number, the unique identifier, an account number, and a withdrawal amount received by the internal API.

7. The method of claim 1, wherein the validity of the transaction is confirmed based on a withdrawal amount and the unique identifier received by the ATM from the user.

8. The method of claim 7, wherein the validity of the transaction is confirmed by providing, via the internal API, the withdrawal amount and the unique identifier to the issuer API affiliated with an entity other than a provider of the ATM.

9. The method of claim 1, wherein the unique identifier for the transaction request is generated at the issuer API.

10. The method of claim 1, wherein the unique identifier for the transaction request is generated at the internal API.

11. A system comprising:
    a first processor and a first memory, the first memory storing instructions which, when executed by the first processor, cause the first processor to implement an issuer application programming interface (API) associated with an account holder which:
      receives a transaction request for a user;
      validates and authorizes the transaction request;
      forwards information about the transaction to an internal API associated with an automated teller machine (ATM);
      generates a unique identifier for the transaction request; and
      provides the unique identifier to a mobile device of the user;
    an ATM which receives the unique identifier from the user at the ATM without the user presenting any card and without connecting a mobile device of the user to the ATM, provides the unique identifier to the internal API, and, upon receiving confirmation of a validity of the transaction, implements the transaction by one or more of (i) dispensing cash to the user and (ii) accepting a deposit from the user; and
    a second processor and a second memory, the second memory storing instructions which, when executed by the second processor, cause the second processor to implement the internal API of a provider of the ATM which:
      receives the information about the transaction from the issuer API;
      receives the unique identifier from the ATM; and
      selectively provides a confirmation of the validity of the transaction to the ATM based upon the information and the unique identifier.

12. The system of claim 11, wherein the transaction request is received via a point of sale terminal for a merchant.

13. The system of claim 12, wherein the unique identifier is provided to the user via the merchant point of sale terminal.

14. The system of claim 11, wherein the account holder is a merchant and wherein the transaction request is a request for a payment to the user from an account of the merchant.

15. The system of claim 14, wherein the issuer API also debits the account of the merchant by an amount of the requested payment to the user.

16. A system comprising:
a first processor and a first memory, the first memory storing instructions which, when executed by the first processor, cause the first processor to implement an issuer application programming interface (API) associated with an account holder which:
receives a transaction request for a user;
validates and authorizes the transaction request; and
forwards information about the transaction to an internal API associated with an automated teller machine (ATM);
an ATM which receives a unique identifier from the user at the ATM without the user presenting any card and without connecting a mobile device of the user to the ATM, provides the unique identifier to the internal API, and, upon receiving confirmation of a validity of the transaction, implements the transaction by one or more of (i) dispensing cash to the user and (ii) accepting a deposit from the user; and
a second processor and a second memory, the second memory storing instructions which, when executed by the second processor, cause the second processor to implement the internal API of a provider of the ATM which:
receives the information about the transaction from the issuer API;
generates a unique identifier for the transaction request; and
provides the unique identifier to the mobile device of the user;
receives the unique identifier from the ATM; and
selectively provides a confirmation of the validity of the transaction to the ATM.

17. The system of claim 16, wherein the transaction request is received via a point of sale terminal for a merchant.

18. The system of claim 17, wherein the unique identifier is provided to the user via the merchant point of sale terminal.

19. The system of claim 16, wherein the account holder is a merchant and wherein the transaction request is a request for a payment to the user from an account of the merchant.

20. The system of claim 19, wherein the issuer API also debits the account of the merchant by an amount of the requested payment to the user.

* * * * *